United States Patent
Peschina (10) Patent No.: US 11,597,021 B2
(45) Date of Patent: Mar. 7, 2023

(54) HOBBING MACHINE, COMPRISING A HOBBING SLIDE AND A CHAMFERING SLIDE ON A COMMON RAIL SYSTEM

(71) Applicant: Felsomat GmbH & Co. KG, Königsbach-Stein (DE)

(72) Inventor: Jürgen Peschina, Knittlingen (DE)

(73) Assignee: Felsomat GmbH & Co. KG, Konigsbach-Stein (DE)

( * ) Notice: Subject to any disclaimer, the term of this patent is extended or adjusted under 35 U.S.C. 154(b) by 132 days.

(21) Appl. No.: 16/779,919

(22) Filed: Feb. 3, 2020

(65) Prior Publication Data
US 2020/0223000 A1 Jul. 16, 2020

Related U.S. Application Data

(63) Continuation of application No. PCT/EP2018/070039, filed on Jul. 24, 2018.

(30) Foreign Application Priority Data

Aug. 2, 2017 (DE) .................... 10 2017 213 361.9

(51) Int. Cl.
*B23F 5/22* (2006.01)
*B23F 17/00* (2006.01)
(Continued)

(52) U.S. Cl.
CPC ................ *B23F 5/163* (2013.01); *B23F 5/22* (2013.01); *B23F 19/10* (2013.01); *B23F 19/102* (2013.01);
(Continued)

(58) Field of Classification Search
CPC ................ B23F 17/006; B23Q 39/024; Y10T 29/5109; Y10T 29/5114;
(Continued)

(56) References Cited

U.S. PATENT DOCUMENTS 3,874,257 A * 4/1975 Hikota .................... B23B 3/167
82/159
5,313,694 A * 5/1994 Yonemoto ............ G05B 19/182
29/27 R
(Continued)

FOREIGN PATENT DOCUMENTS

CN 101448596 A 6/2009
CN 202846158 U * 4/2013
(Continued)

OTHER PUBLICATIONS

Machine Translation of CN 202846158 U, which CN '158 was published Apr. 2013.*

*Primary Examiner* — Erica E Cadugan
(74) *Attorney, Agent, or Firm* — Orbit IP (57) ABSTRACT

A hobbing machine is disclosed having a workpiece spindle, by means of which a workpiece can be rotated about a workpiece axis, a hobbing head, at least one chamfering device, a first slide with a first slide guide system, wherein the hobbing head is arranged on the first slide, and a rail system. The first slide, by means of its first slide guide system, is arranged in a displaceable manner on the rail system. The hobbing machine also has a second slide with a second slide guide system. The at least one chamfering device is arranged on the second slide. Also, the second slide, by means of its second slide guide system, is arranged in a displaceable manner on the rail system, such that the first slide and the second slide can be displaced on an identical portion of the rail system. Presented is a structurally simple hobbing machine by means of which a workpiece can be hobbed and chamfered in a short period of time.

15 Claims, 8 Drawing Sheets

(51) Int. Cl.
  *B23F 19/10* (2006.01)
  *B23Q 39/02* (2006.01)
  *B23F 5/16* (2006.01)
(52) U.S. Cl.
  CPC .......... *B23F 17/006* (2013.01); *B23Q 39/024* (2013.01); *Y10T 29/5176* (2015.01); *Y10T 409/10159* (2015.01); *Y10T 409/101113* (2015.01); *Y10T 409/108586* (2015.01)
(58) Field of Classification Search
  CPC .... Y10T 409/10–409/109699; Y10T 29/5176; B23B 3/065; B23B 3/16–3/168; B23B 11/00
  USPC ...................... 29/27 C, 27 R, 56.5; 409/1–62
  See application file for complete search history.

(56) References Cited

U.S. PATENT DOCUMENTS

| | | | |
|---|---|---|---|
| 6,626,075 B2* | 9/2003 | Hirose | B23Q 39/026 82/121 |
| 8,006,359 B2 | 8/2011 | Jaeger | |
| 8,967,925 B2* | 3/2015 | Tsuchimochi | B23F 5/22 409/15 |
| 10,226,830 B2 | 3/2019 | Thijssen et al. | |
| 2003/0041706 A1* | 3/2003 | Sugiura | B23F 9/08 82/1.11 |
| 2007/0053756 A1* | 3/2007 | Horn | B23Q 17/2283 409/131 |
| 2007/0209179 A1* | 9/2007 | Williams | B23F 9/082 29/27 C |
| 2009/0238654 A1 | 9/2009 | Jaeger et al. | |
| 2009/0311063 A1 | 12/2009 | Carmincke et al. | |
| 2013/0047390 A1* | 2/2013 | Ongaro | B23F 17/006 29/27 C |
| 2014/0255118 A1* | 9/2014 | Zeller | B23C 1/04 409/40 |
| 2017/0120358 A1 | 5/2017 | Landi et al. | |
| 2018/0339353 A1 | 11/2018 | Kleinbach et al. | |

FOREIGN PATENT DOCUMENTS

| | | | |
|---|---|---|---|
| CN | 104625242 A | | 5/2015 |
| CN | 105414990 A | | 3/2016 |
| DE | 3312984 A | * | 10/1984 |
| DE | 9302520 U1 | | 3/1994 |
| DE | 195 18 483 A1 | | 11/1996 |
| DE | 102 11 129 A1 | | 10/2003 |
| DE | 20 2005 014 619 U1 | | 2/2006 |
| DE | 10 2006 021 946 A1 | | 11/2007 |
| DE | 10 2006 044 738 B3 | | 4/2008 |
| DE | 10 2011 110 911 A1 | | 2/2013 |
| DE | 10 2011 084 975 A1 | | 4/2013 |
| DE | 10 2013 212 430 A1 | | 12/2014 |
| DE | 10 2013 212 432 A1 | | 12/2014 |
| DE | 10 2014 218 082 A1 | | 3/2016 |
| DE | 20 2013 012 505 U1 | | 1/2017 |
| DE | 10 2015 015 810 A1 | | 6/2017 |
| EP | 0 120 588 A2 | | 10/1984 |
| EP | 1 004 397 A2 | | 5/2000 |
| EP | 2 456 587 B1 | | 1/2014 |
| JP | 2000-141129 A | * | 5/2000 |

* cited by examiner

Fig. 7

HOBBING MACHINE, COMPRISING A HOBBING SLIDE AND A CHAMFERING SLIDE ON A COMMON RAIL SYSTEM

CROSS-REFERENCE TO RELATED APPLICATIONS

This continuation application claims priority to PCT/EP2018/070039 filed on Jul. 24, 2018 which has published as WO 2019/025240 A1 and also the German application number 10 2017 213 361.9 filed on Aug. 2, 2017, the entire contents of which are fully incorporated herein with these references.

DESCRIPTION

Field of the Invention

The invention relates to a hobbing machine comprising: a workpiece spindle, by means of which a workpiece can be rotated about a workpiece axis; a hobbing head; at least one chamfering device; a first slide with a first slide guide system, wherein the hobbing head is arranged on the first slide; and a rail system, wherein the first slide, by means of its first slide guide system, is arranged in a displaceable manner on the rail system.

Background of the Invention

Such a hobbing machine is known from DE 10 2013 212 430 A1.

Toothed workpieces such as toothed wheels and transmissions are required for a variety of reasons in machines and vehicles. Toothed workpieces can be produced cost-effectively by hobbing, wherein a workpiece and a hob are rotated while in engagement with one another. Thereafter, the end face edges of the teeth of the workpiece are usually chamfered, on the one hand in order to remove burrs from the workpiece and on the other hand in order to realize broken edges. The chamfering operation can take place, in principle, by machining or forming/deformation.

In many cases, different machines are provided for the hobbing and the chamfering operations. This is, indeed, a straightforward way of doing things, but the multiple transporting processes as well as the clamping in and unclamping processes render it time-consuming. In addition, a large amount of equipment is required.

DE 10 2013 212 430 A1 proposes a hobbing machine in which a hobbing head and two chamfering devices are arranged on a common slide. The common slide can be displaced on rails parallel to an axis of rotation of a workpiece spindle. The chamfering devices can be displaced on the common slide and comprise chamfering disks in order to subject the edges of the teeth to plastic pushing-in deformation. The hobbing and the chamfering operations can take place here in a short period of time with a single workpiece-clamping setup.

The disadvantage with this machine tool is the considerable level of structural outlay. The common slide is fairly large, and therefore difficult to manufacture and to install. Since it has to bear both the hobbing head and the chamfering devices, including positioning devices, the common slide is additionally very heavy, and therefore the slide guide system is subjected to pronounced mechanical loading and quickly shows signs of wear.

DE 20 2013 012 505 U1 has disclosed the practice, during the processing of edges of teeth on the end face of a workpiece, for example in order to produce a chamfer, of bringing the rotating workpiece into rolling engagement with a rotating tool, wherein material is removed from the edge of the teeth by cutting, and wherein use is made of an axis-crossing angle other than zero. The use of the axis-crossing angle is known from skiving.

DE 10 2014 218 082 A1 describes a method for machining chamfers on edges of teeth. In this method, a toothed tool is rotated about a tool axis, wherein the tool axis has been pivoted about an azimuthal angle $\varphi$ (corresponding to the axis-crossing angle) and a latitude angle $\gamma$ in relation to an axis of the toothed workpiece, and therefore a cutting edge of a tool tooth slides along the edge of the tooth and a chamfer is produced on the toothed workpiece; the pivoting in relation to the latitude angle $\gamma$ is described usually using a polar angle $\Theta=90°-\gamma$. At that, $\varphi>0$ and $\Theta<90°$ are chosen. An associated hobbing machine has a rotatable drum-type holder for two workpiece spindles, wherein rotation of the drum-type holder provides for changeover between a station for hobbing operation and a station for chamfering operation. This hobbing machine, in turn, provides for hobbing and chamfering operations in a short period of time with a single clamping setup, but, once again, involves very high outlay in structural terms.

The operation of producing chamfers on a toothed workpiece in rolling engagement with a toothed tool at an azimuthal angle or axis-crossing angle other than zero is referred to hereinbelow as chamfering by skiving.

SUMMARY OF THE INVENTION

Object of the Invention

It is the object of the invention to present a structurally simple hobbing machine by means of which a workpiece can be hobbed and chamfered in a short period of time.

BRIEF DESCRIPTION OF THE INVENTION

This object is achieved by a hobbing machine of the type mentioned in the introduction, which is characterized in that the hobbing machine also comprises: a second slide with a second slide guide system, wherein the at least one chamfering device is arranged on the second slide; and in that also the second slide, by means of its second slide guide system, is arranged in a displaceable manner on the rail system, such that the first slide and the second slide can be displaced on an identical portion of the rail system.

According to the invention, the essential machining devices of the hobbing machine are distributed between two slides. Distributing the hobbing head to the first slide and the at least one chamfering device to the second slide avoids an overly heavy and large common slide for the hobbing head and chamfering device. This means that the construction of the hobbing machine is simplified and costs are reduced. The two relatively small and lightweight slides of the hobbing machine according to the invention are simple to manufacture and to install.

The slide guide system of each slide need absorb just a comparatively small level of force (weight-induced force), which, in turn, is particularly simple in structural terms and reduces the wear to the slide guide systems.

Further, according to the invention, the rail system of the two slides is used in common. This further reduces the structural outlay required for the hobbing machine, and the hobbing machine is rendered compact. Since the hobbing head and the at least one chamfering device in any case cannot be used at the same time on the same toothing formation, it is also the case that the two slides in general do not obstruct one another. In addition, the common rail system improves the accuracy of the slide movements; in particular, the two slides are secured by the rail system in an identical manner in a direction transverse to the displacement direction.

The rail system comprises one or more rails. Both the first slide and the second slide are mounted in a displaceable manner at least on one of the rails, and typically on all the rails, of the rail system ("common rail system"). The rail system typically runs in a rectilinear manner ("linear rail system"). If necessary for the respective machining task, the hobbing head and the at least one chamfering device are displaceable and/or pivotable, typically displaceable and/or pivotable by a motor, on their respective slide.

If desired, the first slide and/or the second slide can be provided with a dedicated position sensor for determining the position of the respective slide on the rail system. It is likewise possible, if desired, for the first and/or the second slide to be equipped with a dedicated arresting system, in order for the respective slide to be retained in a non-displaceable manner on the rail system.

The workpiece spindle is typically formed at a fixed location. In most cases, the hobbing machine comprises just one workpiece spindle. The at least one chamfering device can be designed for a chamfering operation by forming/deformation or by machining.

Preferred Embodiments of the Invention

In the case of a preferred embodiment of the hobbing machine according to the invention, both the first slide and the second slide are designed in the form of driven slides. By virtue of the two slides being driven directly in each case, it is possible to minimize mechanical hystereses in the transmission of forces to the respective slides. In this way a particularly precise placement of the slides can be provided, usually also without monitoring by a position sensor on the respective slide. Likewise by means of the motor drive a respective slide can be retained in position on the rail system, usually without a particular arresting system (brake), during workpiece machining. The driven slides themselves are each connected up directly to a motor drive, by means of which the respective slide can be moved on the rail system; a driven slide need not be pushed or pulled by another slide.

A preferred development of this embodiment provides, for each driven slide, a dedicated motor drive, by means of which the driven slide can be displaced on the rail system. This means that the two slides can be displaced independently of one another. This simplifies control processes and provides for more flexible workpiece machining. In addition, each motor drive requires only a relatively small amount of power in order to displace its respective slide.

In the case of an alternative, advantageous embodiment, a common motor drive is provided for the two driven slides. By virtue of the two slides using the common motor drive, the hobbing machine can be designed in a cost-effective manner.

Provision is preferably made here for the common motor drive to comprise a drive motor, which is arranged on a machine bed and drives an externally threaded drive spindle, in particular a ball screw, for the first slide to have a first internally threaded force-transmission element, in particular a nut fastened on the first slide, and for the second slide to have a second internally threaded force-transmission element, in particular a nut fastened on the second slide, and for the first force-transmission element and the second force-transmission element both to be seated on the drive spindle. This construction is cost-effective and not susceptible to malfunctioning. Rotation of the drive spindle is converted equally by the two force-transmission elements into an axial movement, which carries along the respectively associated slide. Monitoring of the rotation of the drive spindle allows the position of the two slides to be monitored with a high level of accuracy even without a position sensor on the slide. Blocking of the rotation of the drive spindle, in addition, allows the slides to be fixed axially in a simple manner.

A preferred embodiment makes provision for one of the slides to be designed in the form of a driven slide, wherein a motor drive is provided for the driven slide and can displace the driven slide on the rail system, for the other slide to be designed in the form of a non-driven slide, and for a coupling device to be provided, by means of which the driven slide and the non-driven slide can be coupled to one another mechanically, in particular are coupled to one another mechanically. Since just one slide has to be connected up to the motor drive, use can be made of a comparatively simple drive mechanism, and therefore a simple and cost-effective construction. At the same time, overall just one motor drive, in particular just one drive motor, is required in order to move the two slides, this being particularly cost-effective. The movement of the driven slide is transmitted to the non-driven slide via the coupling device (mechanical connection) of the two slides; the coupling device can be formed with simple and cost-effective components, for example a screw-connection. In addition, this construction is also well-suited for retrofitting a simple machine which was formed, for example, up until this point just with a single slide with a hobbing head and no chamfering device: all that is required is for a retrofitted, non-driven slide with chamfering device to be placed in position on the existing rail system and to be coupled to the driven slide with the hobbing head. The coupling device is typically installed on a permanent basis; however, it is also possible for the slides to be coupled and uncoupled during operation, for example in order to allow a slide which is not required for a certain period of time to be at rest while the other one is moving, and thus to reduce the amount of energy consumption and wear. The non-driven slide itself cannot be connected up directly to a motor drive; rather, for displacement on the common rail system, it can just be pulled or pushed by the driven slide.

A preferred development of this embodiment provides, for the non-driven slide, a dedicated position sensor, which can determine a displacement position of the non-driven slide on the rail system. This makes it possible to detect and correct any positioning error of the non-driven slide along the rail system when it is being pulled or pushed by the driven slide, for example as a result of mechanical hystereses in the coupling device. If desired, it is also possible to provide a dedicated arresting system (brake) for the non-driven slide, in order to maintain a certain displacement position on the rail system, in particular during chamfering. The driven slide can typically be precisely positioned and arrested on the rail system via its motor drive; if desired, it is also possible, in addition, for a dedicated position sensor and/or a dedicated arresting system (brake) to be provided for the driven slide.

Also, a preferred development is one in which the driven slide is the first slide and the non-driven slide is the second slide. This relieves the coupling device of loading and reduces mechanical hystereses, since the second slide with the at least one chamfering device is usually lighter than the first slide with the hobbing head.

In the case of an advantageous development, the coupling device is designed to connect the two slides to one another rigidly along a displacement axis on the rail system. The rigid connection minimizes positioning errors (for example on account of mechanical hystereses) caused by the indirect driving of the non-driven slide. The two slides can be moved back and forth along the (common) displacement axis; the connection here is rigid in terms of both tension and compression. The connection of the slides is typically rigid throughout (in particular also in a direction transverse to a displacement axis). As an alternative, a movable coupling which is prestressed in a play-free manner is also possible; in this case, the non-driven slide is typically provided with a dedicated position sensor and usually also a dedicated arresting system.

Provision is preferably made here for the slides to form mutual abutment surfaces which face one another, as seen in relation to the displacement axis, and for the coupling device to comprise a tensioning device, which engages around at least parts of the two slides and braces the slides, with abutting abutment surfaces, against one another. This construction is simple and minimizes play between the slides when the non-driven slide is being pulled and pushed. As long as the tensioning device preserves a minimum amount of elastic tension, that is to say the mutual abutment surfaces do not lose contact, no play should be expected in practice between the slides.

Furthermore, a preferred embodiment is one in which the workpiece axis of the workpiece spindle and a displacement axis of the rail system run parallel to one another, in particular wherein the workpiece axis and the displacement axis run horizontally. This provides for a particularly compact construction of the hobbing machine. In addition, the movement of the slides on the rail system can be used to good effect for positioning the tools both for hobbing operation and for chamfering operation. When the displacement axis runs horizontally, the slides can be displaced with only a low level of force being required.

A particularly preferred embodiment is one in which the first slide guide system and the second slide guide system are formed with rolling bearings. Rolling bearings for heavy slides are particularly expensive and susceptible to wear, and therefore distributing of the hobbing head and chamfering device between two slides is particularly advantageous here. Furthermore, the rolling bearings run particularly smoothly. As an alternative, it is also possible to use plain bearings in the slide guide systems.

Also, an advantageous embodiment is one in which two chamfering devices are arranged on the second slide. Using two chamfering devices, it is possible for two different axial regions of a workpiece, or also left-hand and right-hand chamfers of the same teeth or of the same end face of a tooth, to be produced in quick succession (or even, if the chamfering devices are set up appropriately, simultaneously).

Furthermore, a particularly preferred embodiment is one in which the at least one chamfering device is designed for chamfering by skiving. Chamfering devices for chamfering by skiving, in particular with double tilting (see below), are relatively heavy on account of the degrees of freedom of movement required, and therefore, in this case, distributing the hobbing head and chamfering device between different slides relieves the slide guide systems ("slide bearings") of loading to a particularly great extent.

A particularly preferred development of this embodiment is one in which the at least one chamfering device is designed for chamfering by skiving at an azimuthal angle $\varphi>0°$ and a polar angle $\Theta<90°$. Chamfering by skiving with double tilting of the tool axis is described in DE 10 2014 218 082 A1, and reference is hereby made in full to the content thereof. The double tilting means that the chamfering operation is subject to geometrical limitations to a particularly low extent.

A preferred further refinement of this development is one which makes provision for the workpiece axis to run along an x direction, for a toolholder on the second slide to be able to be displaced in each case linearly in a y direction and a z direction, wherein the x, y and z directions form a right-angled coordinate system, for a tool spindle for a toothed tool to be arranged on the toolholder, and for a tool axis, about which the tool spindle can be rotated, to be pivoted by the azimuthal angle $\varphi>0°$ in an xy plane in relation to the x direction and by the polar angle $\Theta<90°$ in relation to the z direction, in particular wherein the x direction and the z direction run horizontally. With this construction, chamfering by skiving with double tilting of the tool axis can be done in an easy way. The displacement axis of the rail system, along which the first slide and the second slide can be displaced, typically runs parallel to the x direction.

Provision is preferably made here so that a rotary mount is arranged on the toolholder and can be rotated, in particular rotated by a motor, about an axis of rotation DA, wherein the axis of rotation runs parallel to the z direction, and that the tool spindle is arranged on the rotary mount. The rotary mount allows the tool spindle, or the tool retained there, to change position in order for the two opposite sides of a workpiece to be machined; the two sides of the workpiece can then be machined in quick succession. Changeover typically takes place merely between two rotary positions, rotated through 180°, for the purpose of machining the front side and rear side of the workpiece.

Furthermore, provision is advantageously made for two chamfering devices for chamfering by skiving to be arranged on the second slide, wherein it is also the case that a further tool spindle for a further toothed tool is arranged on the rotary mount, and wherein a further tool axis, about which the further tool spindle can be rotated, is pivoted by a further azimuthal angle $\varphi w$ in the xy plane in relation to the x axis and by a further polar angle $\Theta w$ in relation to the z axis, where $\varphi w=-\varphi$ and $\Theta w=\Theta$. This positioning of the tool axis and further tool axis allows the left-hand and right-hand chamfers on a workpiece, or on an end face of a tooth of the workpiece, to be produced in quick succession and under the same conditions.

Further advantages of the invention can be gathered from the description and the drawing. Similarly, the features mentioned above and those explained below can each be used, according to the invention, on their own or together in any desired combinations. The embodiments shown and described should not be understood as an exhaustive list, but rather are of an exemplary character for the description of the invention.

BRIEF DESCRIPTION OF THE DRAWINGS

The invention will be explained in more detail with reference to exemplary embodiments and is illustrated in the drawing, in which.

DETAILED DESCRIPTION OF THE PREFERRED EMBODIMENTS

Figure 1:
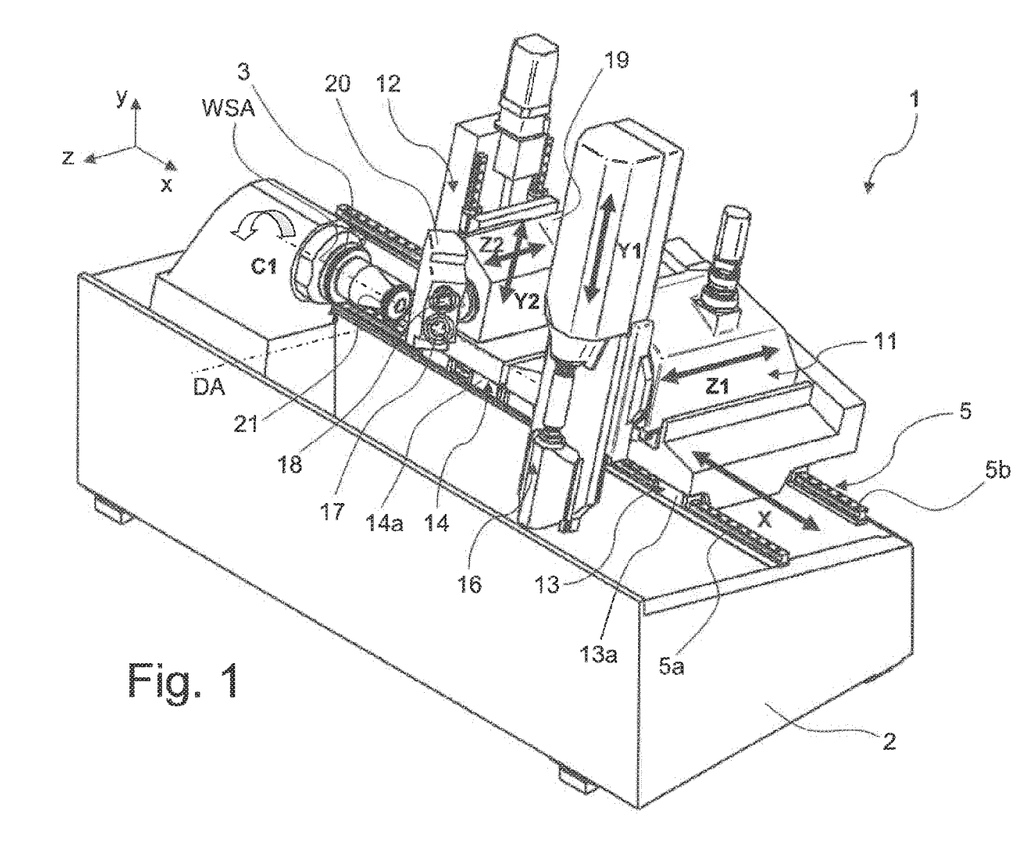
FIG. 1 shows a schematic perspective view, as seen obliquely from the front, of a first embodiment of a hobbing machine according to the invention, without a counter bearing.
Figure 2:
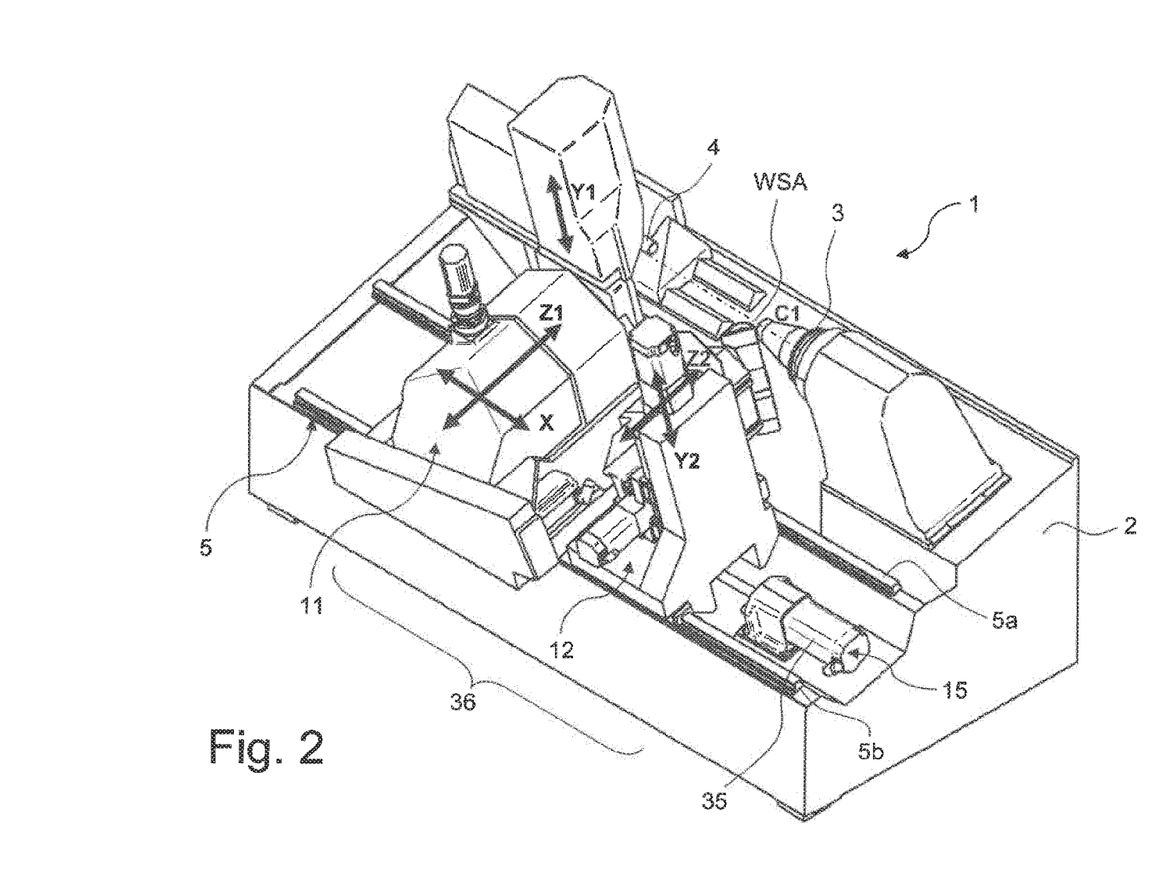
FIG. 2 shows a schematic perspective view, as seen obliquely from the rear, of the hobbing machine from FIG. 1, with a counter bearing.

FIG. 1 illustrates a schematic perspective view, as seen obliquely from the front, and FIG. 2 illustrates a schematic perspective view, as seen obliquely from the rear, of a first embodiment of a hobbing machine 1 according to the invention.

A machine bed 2 has arranged on it a fixed-location workpiece spindle 3, which can be rotated about a horizontal workpiece axis WSA, cf. also machine axis C1. The workpiece axis WSA here defines an x direction, which together with the vertical y direction and the likewise horizontal z direction forms a right-angled coordinate system. A workpiece 21 clamped in the workpiece spindle 3 can be supported on a counter bearing 4 (not illustrated in FIG. 1, but cf. FIG. 2), which can be displaced in the x direction.

Also arranged on the machine bed 2 is a rail system 5, that in this case comprises two rails 5a, 5b. The rails 5a, 5b run in the horizontal direction parallel to the workpiece axis WSA. Both a first slide 11 and a second slide 12 are mounted in a displaceable manner on the rail system 5 ("common rail system"), here on both rails 5a, 5b in each case. Accordingly, the two slides 11, 12 can travel, at least in a central region, on an identical portion 36 of the rail system 5. For this purpose, the first slide 11 has a first slide guide system 13, comprising a plurality of (in this case four) rolling bearings (rolling-bearing elements) 13a, and the second slide 12 has a second slide guide system 14, likewise comprising a plurality of (in this case four) rolling bearings (rolling-bearing elements) 14a. The rolling bearings 13a, 14a comprise rollers or balls (not illustrated specifically), which roll on the rails 5a, 5b.

In the embodiment shown, the first slide 11 is designed in the form of a driven slide and can be displaced on the rail system 5, cf. machine axis X, by means of a motor drive 15, which comprises a drive motor 35. In the embodiment shown, the second slide 12 is designed in the form of a non-driven slide and is coupled mechanically to the first slide 11. As a result of being pushed and pulled by the first slide 11, it is also possible for the second slide 12 to be displaced on the rail system 5 (more on this in conjunction with FIG. 3 hereinbelow).

A hobbing head 16 is arranged on the first slide 11 and can be displaced along the machine axes Y1 and Z1, in particular can be positioned against a workpiece 21. The second slide 12 has arranged on it in this case two chamfering devices 17, 18, which are designed for chamfering by skiving with double tilting (more on this in conjunction with FIG. 4, FIG. 5a and FIG. 5b hereinbelow). A toolholder 19 can be displaced on the second slide 12 along the machine axes Y2, Z2, in particular in order for the chamfering devices 17, 18 to be positioned against a workpiece 21. The toolholder 19, in turn, bears a rotary mount 20, which can be rotated about an axis of rotation DA, which runs parallel to the z direction. Two tool spindles of the chamfering devices 17, 18 are arranged on the rotary mount 20.

The positioning systems on the two slides 11, 12 are formed independently of one another. As a result of the hobbing and chamfering operations (including the associated positioning systems) being distributed between the two slides 11, 12, each individual slide 11, 12 is comparatively small and lightweight.

Figure 3:
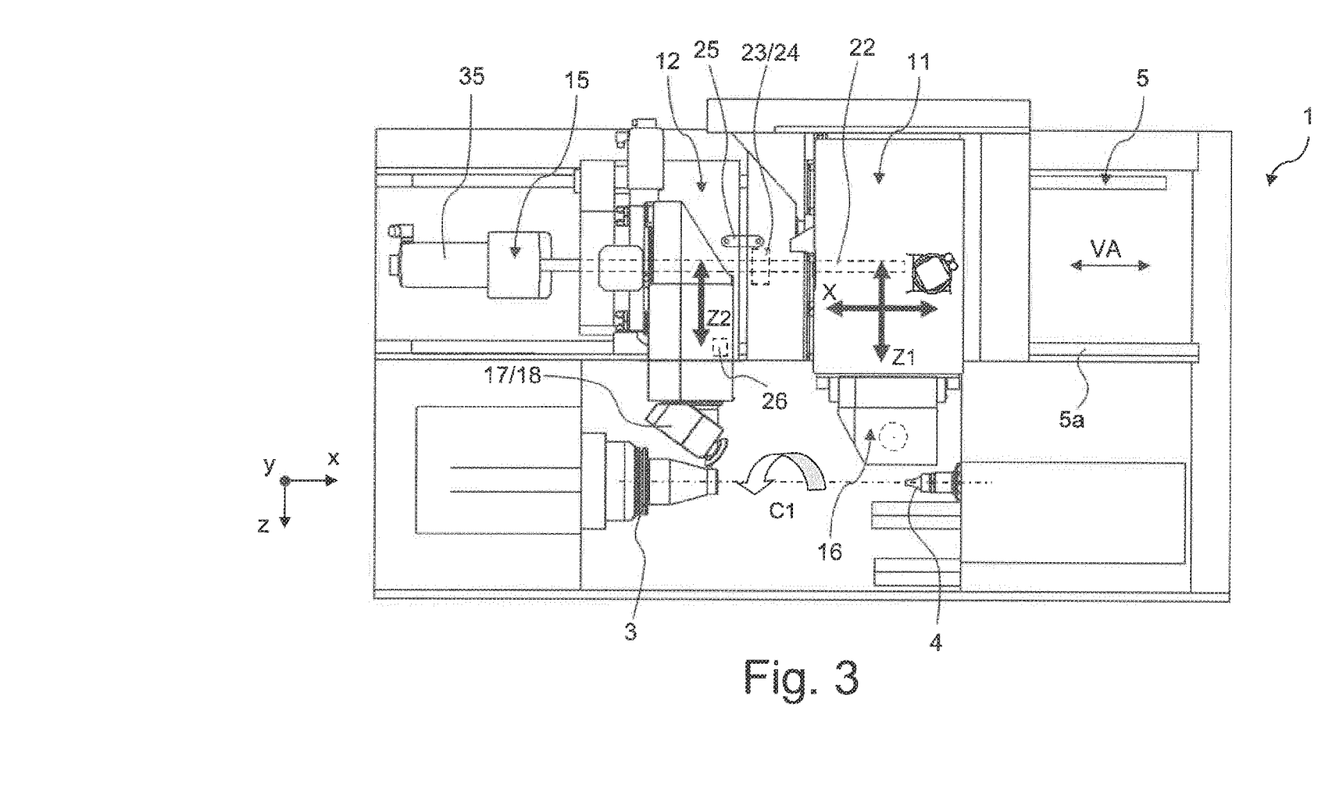
FIG. 3 shows a schematic plan view of the hobbing machine from FIG. 2.

FIG. 3 shows the hobbing machine 1 from FIG. 1 and FIG. 2 in a plan view, which will be used to explain the coupling and the driving of the slides 11, 12 of this embodiment.

The motor drive 15 has the drive motor 35, which is arranged on the machine bed 2; the drive motor 35 drives an externally threaded drive spindle 22, in this case a ball screw. The drive spindle 22 extends parallel to the x direction, that is to say parallel to the displacement axis VA of the rail system 5. The drive spindle 22 here runs along beneath the two slides 11, 12. An internally threaded force-transmission element 23, in this case a nut 24, is positioned on (screwed onto) the drive spindle 22. The force-transmission element 23 is fixed, for example screwed, to the first slide 11 in a manner which is not illustrated specifically. Rotation of the drive spindle 22 then causes the force-transmission element 23, which is retained in a rotationally fixed manner by the slide 11 fixed to it, to push ahead (with screwing action) along the displacement direction VA of the common rail system 5; the first slide 11 is carried along in the process. The first slide 11 is thus a driven slide.

Figure 4:
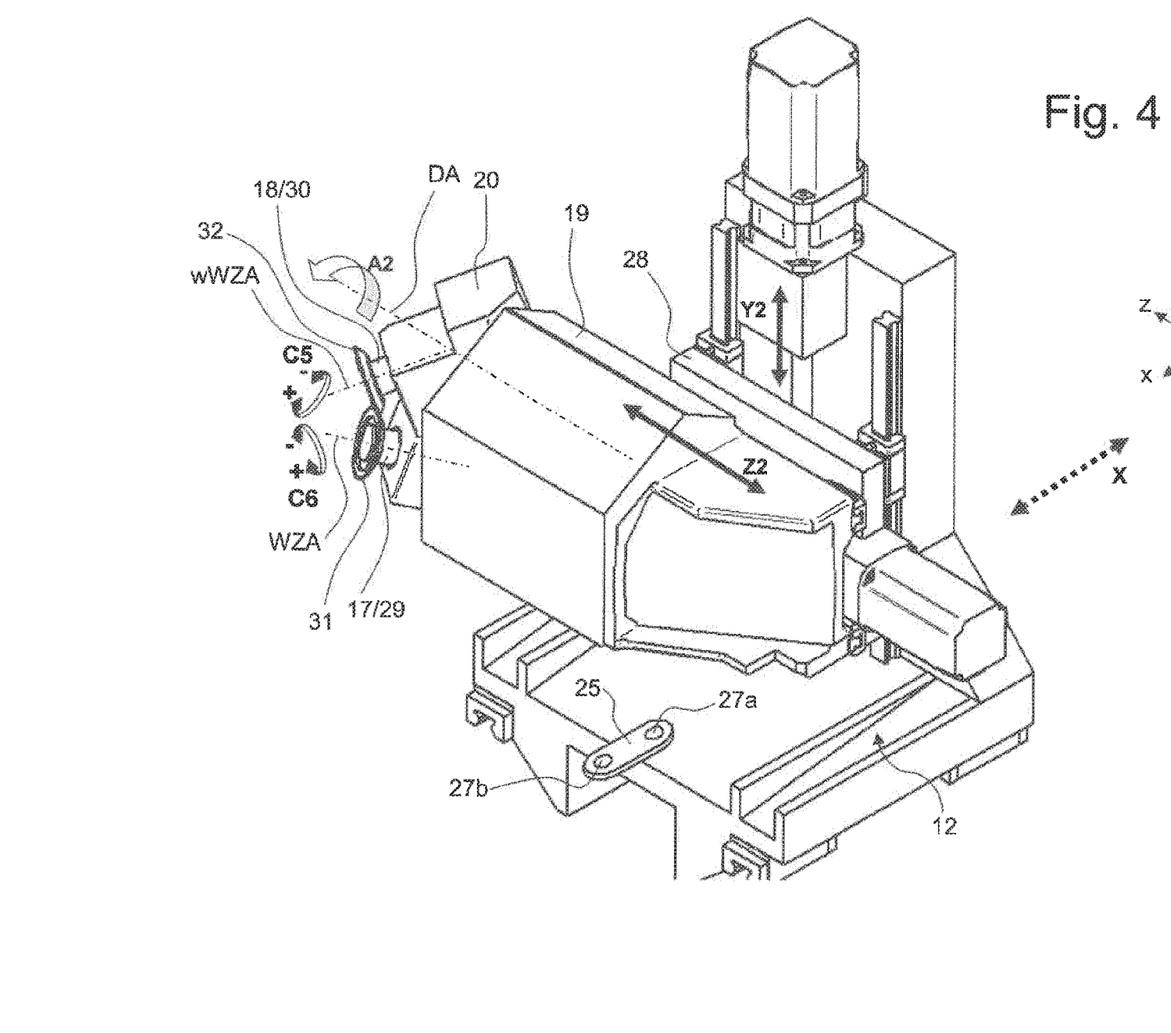
FIG. 4 shows a schematic perspective view, as seen obliquely from the rear, of the second slide of the hobbing machine from FIG. 1.

The second slide 12 is connected to the first slide 11 by a coupling device 25, which is designed in the form of a coupling bar (see, in this respect, FIG. 4). When the first slide 11 moves along the displacement axis VA, the second slide 12 is pushed or pressed by the first slide 11, such that the second slide 12 is also displaced on the common rail system 5.

It should be noted that the force-transmission element 23 is arranged here in the vicinity of the coupling device 25, as a result of which the positioning accuracy of the second slide 12 is improved.

The second slide 12 preferably has a dedicated position sensor (measuring head) 26, which in this case interacts with a positioning system integrated in the front rail 5a. This makes it possible for positioning errors of the second slide 12, for example caused by mechanical hystereses in the coupling device 25, to be detected and corrected (by appropriate displacement of the second slide 12, the motor drive 15 being used indirectly). The position sensor 26 is preferably integrated in a rolling bearing (a rolling-action bearing shoe).

FIG. 4 will be used to explain the second slide 12 and the coupling device 25 in more detail.

The coupling device 25 here is designed in the form of a coupling bar with two holes, wherein a respective screw (not illustrated specifically) is guided through one of the holes 27a, 27b and screwed into a threaded bore (not illustrated specifically) of the respective slide. Although the coupling bar is rotatable on the screws, no obvious rotation of the coupling bar takes place during operation, since the slides 11, 12 are secured laterally (in the z direction) by the rail system 5. The coupling device 25 therefore acts rigidly in the direction of the displacement axis (corresponding to the x direction).

Also shown is the toolholder 19, which can be displaced both in the y direction (cf. machine axis Y2) and in the z direction (cf. machine axis Z2) via a cross-slide system. The cross-slide system here comprises an intermediate support 28. In addition, the toolholder 19, along with the entire second slide 12, can be displaced in the x direction (by coupling to the first slide 11, which can be displaced along the machine axis X).

The rotary mount 20 is arranged on the toolholder 19 and can be rotated by a motor about the axis of rotation DA, cf. machine axis A2. The tool spindle 29 of the (lower) chamfering device 17 and the tool spindle 30 of the (upper) further chamfering device 18 are arranged on the rotary mount 20. The tool axis WZA of the tool spindle 29 is tilted, in this case in a fixed manner, in relation to the further tool axis wWZA of the tool spindle 30. The tool spindle 29 and the further tool spindle 30 can be rotated by a motor, cf. machine axes C6, C5, in order each to drive a retained (clamped-in) toothed tool 31, 32.

Figure 5A:
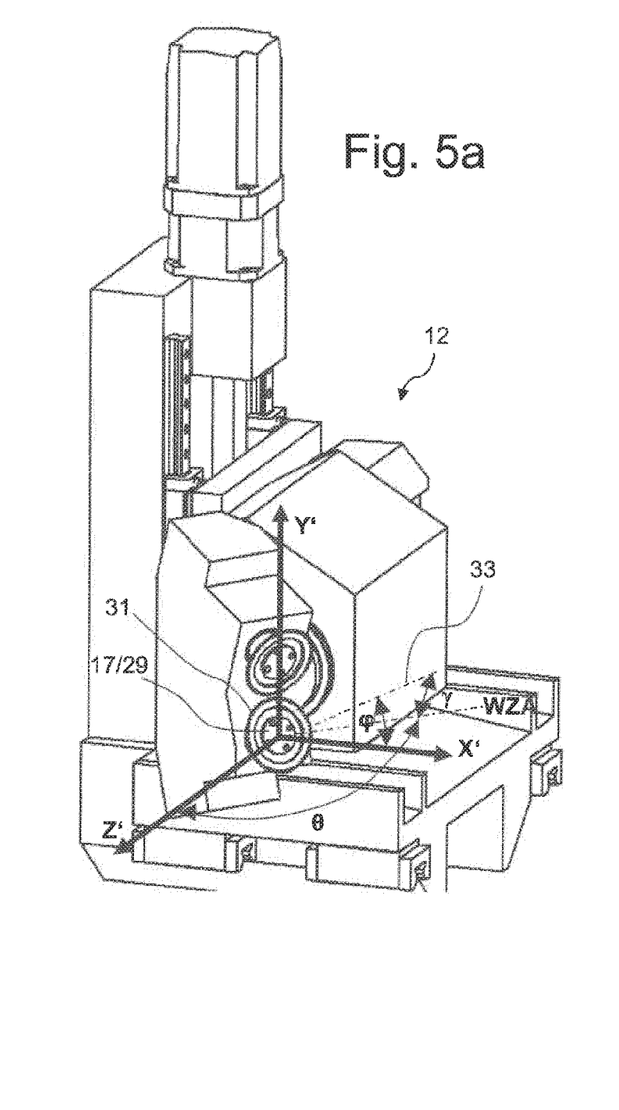
FIG. 5a shows a schematic perspective view, as seen obliquely from the front, of the second slide of the hobbing machine from FIG. 1, including an illustration of the orientation of a lower chamfering tool.

FIG. 5a will be used to explain the orientation of the tool axis WZA of the tool spindle 29 of the lower chamfering device 17. It should be noted here that the axis of a workpiece which is to be machined (not depicted) runs along the x direction. An auxiliary coordinate system x'/y'/z', which has been shifted in a parallel state in relation to the actual xyz coordinate system, is depicted on the tool 31 so that the angular relationships can be seen to better effect.

The tool axis WZA is pivoted by a polar angle $\Theta$ in relation to the z' direction. The difference between the polar angle $\Theta$ and 90° (that is to say the angle between the tool axis WZA and the x'y' plane) is referred to as the latitude angle $\gamma$. Furthermore, a projection 33 of the tool axis WZA onto the x'y' plane has an azimuthal angle (also referred to as the axis-crossing angle) $\varphi$ in relation to the x' direction.

Accordingly, the tool axis WZA is double-tilted in relation to workpiece axis (which runs parallel to the x' direction). This allows chamfering by skiving on the workpiece with double tilting of the tool axis WZA in relation to the workpiece axis, as described in DE 10 2014 218 082 A1, of which the content is included by way of reference in this description.

Figure 5B:
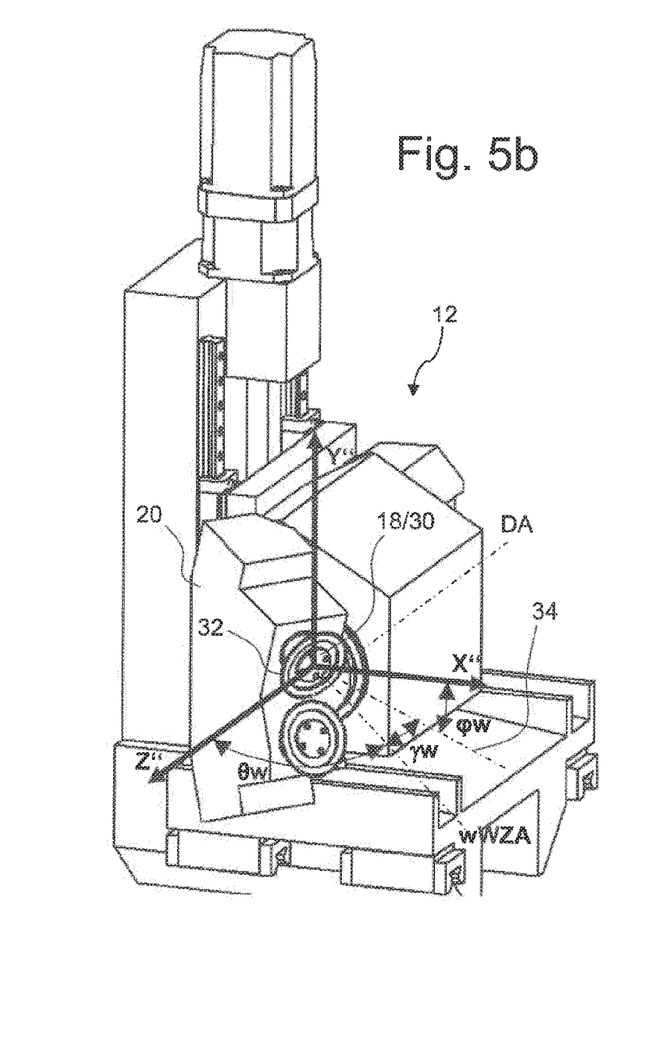
FIG. 5b shows a schematic perspective view, as seen obliquely from the front, of the second slide of the hobbing machine from FIG. 1, including an illustration of the orientation of an upper, further chamfering tool.

FIG. 5b shows the orientation of the further tool axis wWZA of the further tool spindle 30 of the upper chamfering device 18. An auxiliary coordinate system x"/y"/z", which has been displaced in a parallel state in relation to the actual xyz coordinate system, is depicted on the further tool 32 so that the angular relationships can be seen to better effect.

The further tool axis wWZA is pivoted by a further polar angle $\Theta w$ in relation to the z" direction. The difference between the further polar angle $\Theta w$ and 90° (that is to say the angle between the further tool axis wWZA and the x"y" plane) is referred to as the further latitude angle $w\gamma$. Furthermore, a projection 34 of the further tool axis wWZA onto the x"y" plane has a further azimuthal angle $\varphi w$ in relation to the x" direction.

The rotary position of the rotary mount 20 (with the chamfering devices 17, 18 directly one above the other in the y' direction and y" direction) and the fixed tilting of the tool axis WZA and of the further tool axis wWZA in relation to one another here means that $\varphi w = -\varphi$ and $\Theta w = \Theta$.

The two chamfering devices 17, 18 can chamfer left-hand and right-hand tooth flanks on one side of a workpiece. Rotation of the rotary mount 20 by 180° about its axis of rotation DA can achieve conditions appropriate for chamfering a side of the workpiece which is located opposite (as seen in the x direction).

It should be noted that a tool 31, 32 is typically positioned against the workpiece in each case such that the perpendicular of a zone of contact between the tool 31, 32 and workpiece onto the workpiece axis defines the z direction.

Figure 6:
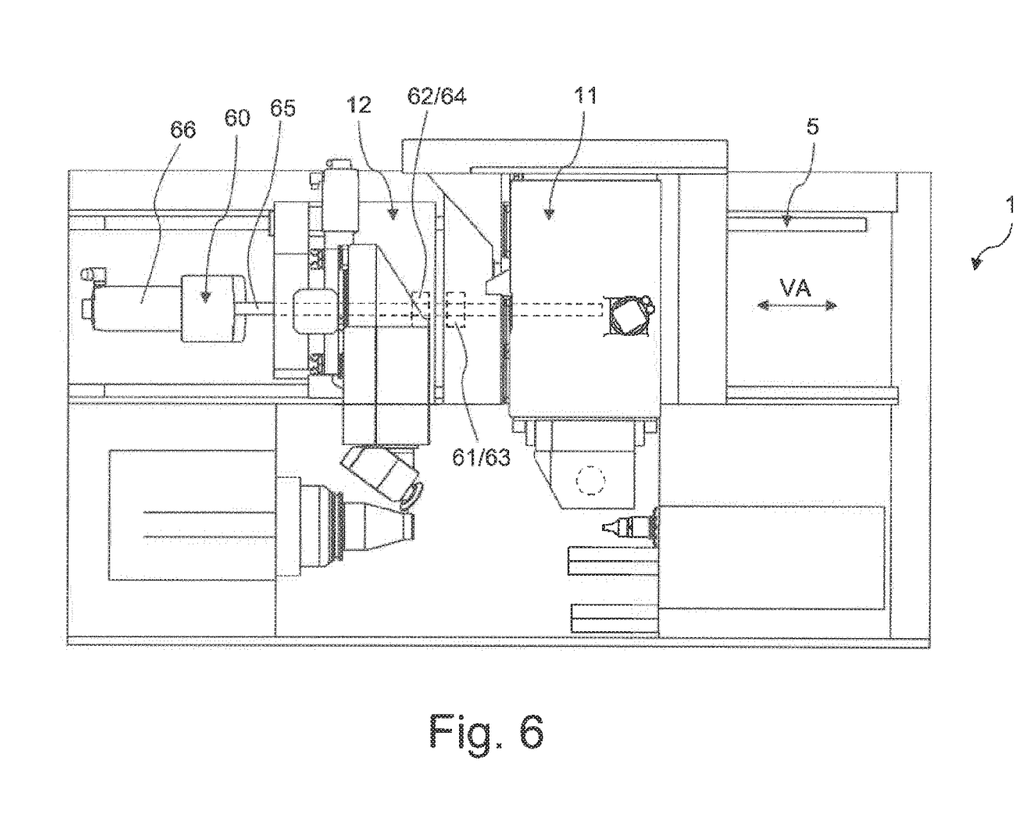
FIG. 6 shows a schematic plan view of a second embodiment of a hobbing machine according to the invention.

FIG. 6 will be used to explain a second embodiment of a hobbing machine 1 according to the invention, this embodiment corresponding largely to the embodiment from FIG. 1 and FIG. 2, and therefore it is only the significant differences which will be explained here.

This embodiment provides a common motor drive 60 for the first slide 11 and the second slide 12. A drive motor 66 of the common motor drive 60 drives an externally threaded drive spindle 65, in this case a ball screw, which runs beneath the first and second slides 11, 12. A first internally threaded force-transmission element 61 in the form of a nut 63 and a second internally threaded force-transmission element 62 in the form of a nut 64 are seated on the drive spindle 65. The first force-transmission element 61 is fixed, for example screwed, to the first slide 11 in a manner which is not illustrated any more specifically, and the second force-transmission element 62 is fixed, for example screwed, to the second slide 12 in a manner which is not illustrated any more specifically.

Rotation of the drive spindle 65 by the drive motor 66 of the common motor drive 60 causes the nuts 63, 64, which are retained in a rotationally fixed manner on their respective slide 11, 12, to move (with screwing action) along the displacement axis of the common rail system 5. The nuts 63, 64 carry along their respective slides 11, 12 in the process.

The two slides 11, 12 are therefore driven separately in each case, but move synchronously in relation to one another at a fixed distance apart (with the exception of any error in the pitch of the drive spindle 65), without a mechanical coupling device connecting the two slides 11, 12. Both the first slide 11 and the second slide 12 here are driven slides.

Figure 7:
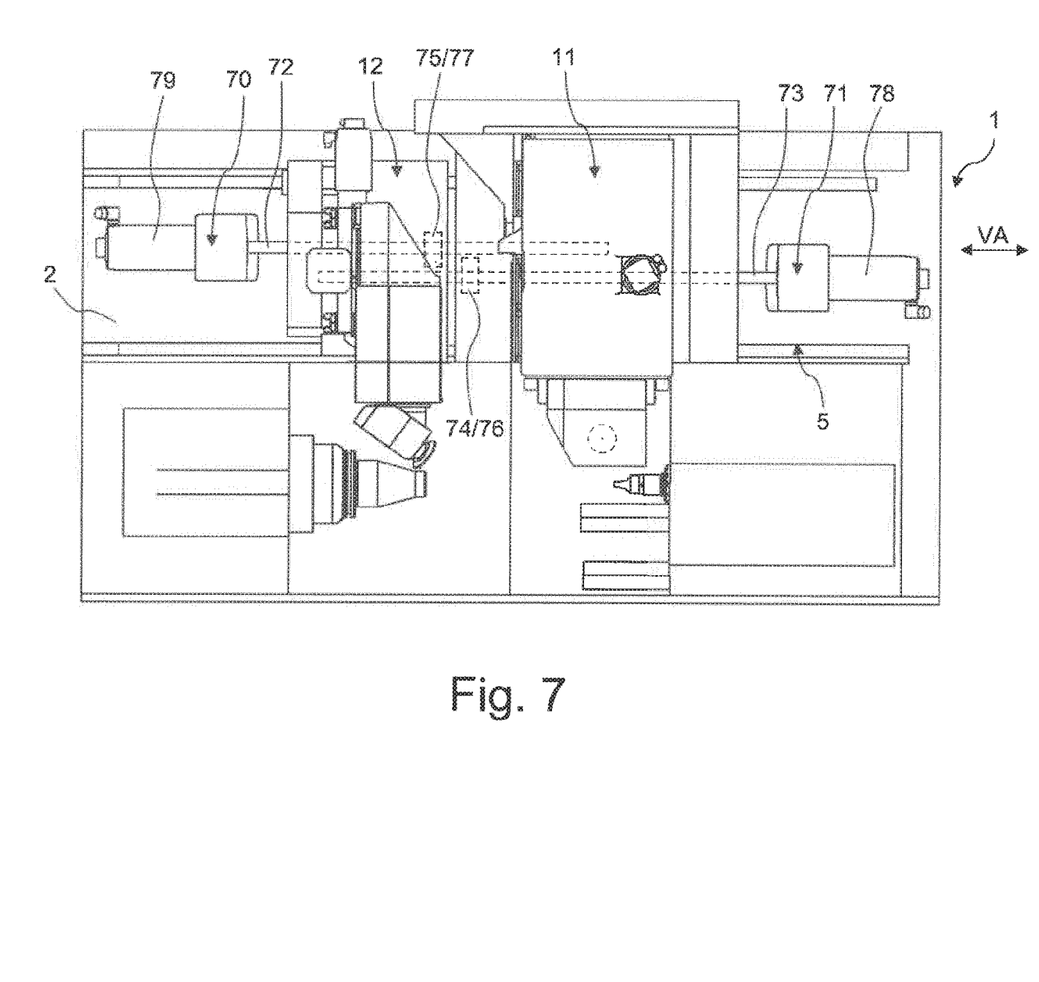
FIG. 7 shows a schematic plan view of a third embodiment of a hobbing machine according to the invention.

FIG. 7 will be used to explain a third embodiment of a hobbing machine 1 according to the invention, this embodiment corresponding largely to the embodiment from FIG. 1 and FIG. 2, and therefore it is only the significant differences which will be explained here.

In the case of this embodiment, the first slide 11 has a dedicated motor drive 71 and the second slide 12 has a dedicated motor drive 70.

A drive motor 78 of the motor drive 71 drives an externally threaded drive spindle 73, in this case a ball screw, on which an internally threaded force-transmission element 74, in this case a nut 76, has been positioned (screwed). The nut 76 is fastened, for example screwed, on the first slide 11 in a manner which is not illustrated any more specifically. A drive motor 79 of the motor drive 70 drives an externally threaded drive spindle 72, in this case a ball screw, on which an internally threaded force-transmission element 75, in this case a nut 77, has been positioned (screwed). The nut 77 is fastened, for example screwed, on the second slide 12 in a manner which is not illustrated any more specifically. The drive spindles 72, 73 run parallel to one another beneath the two slides 11, 12.

Rotation of the drive spindle 73 by the drive motor 78 of the motor drive 71 causes the nut 76, which is retained in a rotationally fixed manner on the first slide 11, to move (with screwing action) along the displacement axis of the common rail system 5. Rotation of the drive spindle 72 by the drive motor 79 of the motor drive 70 causes the nut 77, which is retained in a rotationally fixed manner on the second slide 12, to move (with screwing action) along the displacement axis VA of the common rail system 5. The nuts 76, 77 carry along their respective slides 11, 12 in the process.

The two slides 11, 12 here are driven not just separately, but also independently of one another. In particular it is possible for one of the slides 11, 12 to be moved along the displacement axis VA while the other slide 11, 12 is at rest. Both the first slide 11 and the second slide 12 here are driven slides.

Figure 8:
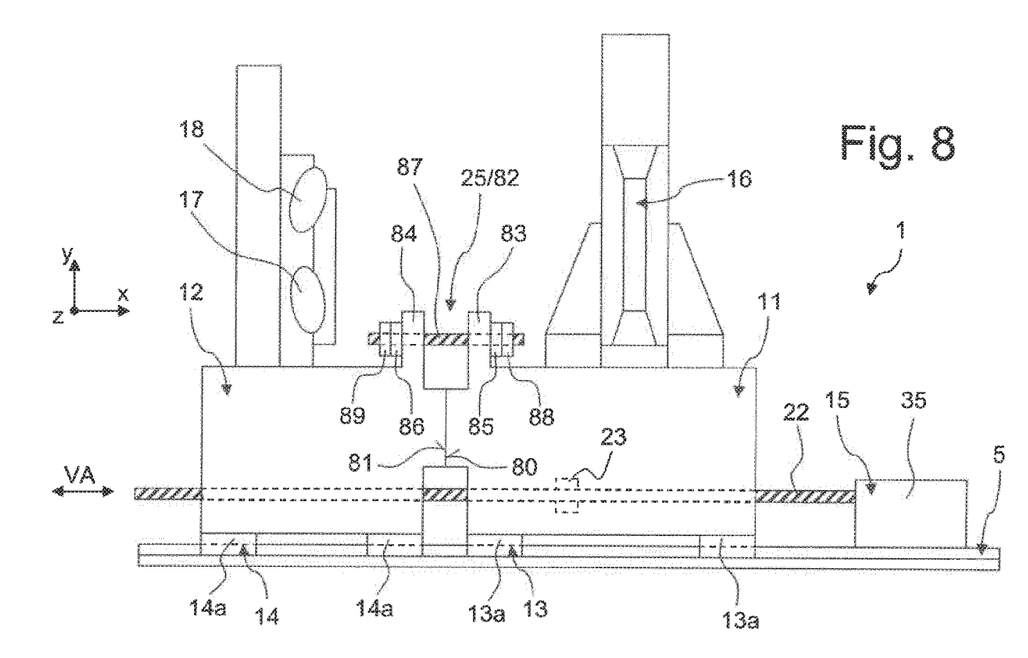
FIG. 8 shows a schematic side view of a fourth embodiment of a hobbing machine according to the invention, comprising a coupling device with a tensioning device.

FIG. 8 will be used to illustrate a coupling device as can be used within the context of the invention, for example for a hobbing machine similar to that in FIGS. 1, 2 and 3. It is only the significant differences which will be explained. For this purpose, FIG. 8 shows a schematic side view of the hobbing machine 1.

The first slide 11 is a driven slide, which in this case is driven by the motor drive 15, having a drive motor 35, via the drive spindle 22 and the force-transmission element 23. The second slide 12 is a non-driven slide. The slides 11, 12 are coupled to one another mechanically by a coupling device 25, and therefore they can be displaced jointly on the common rail system 5, by way of their respective slide guide systems 13, 14, on rolling bearings 13a, 14a.

In the embodiment shown, the slides 11, 12 have mutual abutment surfaces 80, 81, by way of which they are arranged in the state in which they have been moved against one another (as seen in relation to the displacement axis VA), that is to say they butt against one another. The mutual abutment surfaces 80, 81 here run perpendicularly to the displacement axis VA. The coupling device 25 here comprises a tensioning device 82. An externally threaded bolt 87 projects through two hole-containing lugs 83, 84 on the first slide 11 and on the second slide 12. Appropriately internally threaded tensioning nuts 85, 86 are fitted on the outside of the threaded bolt 87, on the far side of the lugs 83, 84 in each case, and said tensioning nuts engage around the lugs 83, 84 and subject the threaded bolt 87 to elastic tensile stressing. Accordingly, the threaded bolt 87 pulls the slides 11, 12 toward one another. The tensioning position of the tensioning nuts 85, 86 is secured here by lock nuts 88, 89. The coupling device 25 here ensures fully rigid coupling of the slides 11, 12, in particular in the x direction and z direction.

LIST OF REFERENCE SIGNS

1 Hobbing machine
2 Machine bed
3 Workpiece spindle
4 Counter bearing
5 (Common) rail system
5a, 5b Rails
11 First slide
12 Second slide
13 First slide guide system
13a Rolling bearing (rolling-bearing element, rolling-action bearing shoe) on the first slide
14 Second slide guide system
14a Rolling bearing (rolling-bearing element, rolling-action bearing shoe) on the second slide
15 Motor drive (for a driven slide)
16 Hobbing head
17 (Lower) chamfering device
18 Further (upper) chamfering device
19 Toolholder
20 Rotary mount
21 Workpiece
22 Drive spindle (for a driven slide)
23 Force-transmission element
24 Nut
25 Coupling device
26 Position sensor
27a, 27b Holes
28 Intermediate support
29 Tool spindle
30 Further tool spindle
31 Toothed tool
32 Further toothed tool
33 Projection of tool axis onto x'y' plane
34 Projection of further tool axis onto x"y" plane
35 Drive motor
36 Identical portion of the rail system
60 Common motor drive
61 First force-transmission element
62 Second force-transmission element
63 Nut (first slide)
64 Nut (second slide)
65 Drive spindle
66 Drive motor (common motor drive)
70 Motor drive (for second slide, in the case of two slides being driven independently of one another)
71 Motor drive (for first slide, in the case of two slides being driven independently of one another)
72 Drive shaft
73 Drive shaft
74 Force-transmission element (first slide)
75 Force-transmission element (second slide)
76 Nut (first slide)
77 Nut (second slide)
78 Drive motor (first slide)
79 Drive motor (second slide)
80 Abutment surface (first slide)
81 Abutment surface (second slide)
82 Tensioning device
83 Hole-containing lug (first slide)
84 Hole-containing lug (second slide)
85 Tensioning nut (first slide)
86 Tensioning nut (second slide)
87 Threaded bolt
88 Lock nut (first slide)
89 Lock nut (second slide)
DA Axis of rotation
VA Displacement axis
WSA Workpiece axis
WZA Tool axis
wWZA Further tool axis
$\gamma$ Latitude angle
$\gamma w$ Further latitude angle
$\varphi$ Azimuthal angle
$\varphi w$ Further azimuthal angle
$\Theta$ Polar angle
$\Theta w$ Further polar angle

What is claimed is:

1. A hobbing machine, comprising:
a machine bed having arranged on it a workpiece spindle, by means of which a workpiece can be rotated about a workpiece axis;
a rail system arranged on the machine bed, the rail system comprising at least one rail arranged on the machine bed, the rail system running in a first horizontal direction parallel to the workpiece axis;
a hobbing head;
at least one chamfering device;
a first slide with a first slide guide system;
wherein the hobbing head is arranged on the first slide;
wherein the first slide, by means of its first slide guide system, is configured to slide on the at least one rail of the rail system in the first horizontal direction parallel to the workpiece axis; and
a second slide with a second slide guide system;
wherein the at least one chamfering device is arranged on the second slide;
wherein the second slide, by means of its second slide guide system, is configured to slide on the at least one rail of the rail system in the first horizontal direction parallel to the workpiece axis;
wherein the at least one rail of the rail system comprises at least one common rail that is used to guide both the first slide guide system and the second slide guide system, wherein each common rail is used in common to guide both the first slide guide system and the second slide guide system;
wherein the hobbing head is configured to slide on and relative to the first slide in a second horizontal direction that is perpendicular to the workpiece axis;
wherein the at least one chamfering device is configured to slide on and relative to the second slide in a third horizontal direction that is perpendicular to the workpiece axis; and
wherein a first movement range of the first slide along the at least one common rail of the rail system and a second movement range of the second slide along the at least one common rail of the rail system overlap defining an identical portion of the rail system, wherein the first slide and the second slide can be displaced along the identical portion of the rail system such that the workpiece is configured to be machined by either the hobbing head or the at least one chamfering device;
wherein the first slide is designed in the form of a driven slide, wherein a motor drive is provided for the driven slide and is configured to slide the driven slide on the at least one common rail in the first horizontal direction, wherein the second slide is designed in the form of a non-driven slide, and wherein a coupling device is provided mechanically connecting the driven slide and the non-driven slide so as to cause the non-driven slide to slide on the at least one common rail when the driven slide is driven to slide on the at least one common rail.

2. The hobbing machine as claimed in claim 1, wherein the non-driven slide has a dedicated position sensor, wherein the position sensor is configured to determine a displacement position of the non-driven slide with respect to the machine bed.

3. The hobbing machine as claimed in claim 1, wherein the coupling device connects the two slides to one another rigidly, wherein the first and second slide move together along a displacement axis defined by the rail system.

4. The hobbing machine as claimed in claim 3, wherein the slides form mutual abutment surfaces which face one another, as seen in relation to the displacement axis, and wherein the coupling device comprises a tensioning device, which engages around at least parts of the two slides and braces the slides, with the abutment surfaces abutting, against one another.

5. The hobbing machine as claimed in claim 1, wherein the first slide guide system and the second slide guide system are formed with rolling bearings.

6. The hobbing machine as claimed in claim 1, wherein the at least one chamfering device comprises two chamfering devices, wherein the two chamfering devices are arranged on the second slide.

7. The hobbing machine as claimed in claim 1, wherein the at least one chamfering device is designed for chamfering by skiving.

8. The hobbing machine as claimed in claim 7, wherein the at least one chamfering device is designed for chamfering by skiving at an azimuthal angle $\varphi>0°$ and a polar angle $\Theta<90°$, and wherein the workpiece axis runs along an x direction, wherein a toolholder can be displaced on the second slide linearly in a y direction and linearly in a z direction, wherein the x, y and z directions form a right-angled coordinate system, wherein a tool spindle for a toothed tool is arranged on the toolholder, and wherein a tool axis, about which the tool spindle can be rotated, is pivoted by the azimuthal angle $\varphi>0°$ in an xy plane in relation to the x direction, and the tool axis is further pivoted by the polar angle $\Theta<90°$ in relation to the z direction.

9. The hobbing machine as claimed in claim 8, wherein the x direction and the z direction run horizontally.

10. The hobbing machine as claimed in claim 8, wherein a rotary mount is arranged on the toolholder and can be rotated about an axis of rotation, wherein the axis of rotation of the rotary mount runs parallel to the z direction, and wherein the tool spindle is arranged on the rotary mount.

11. The hobbing machine as claimed in claim 10, wherein the at least one chamfering device comprises two chamfering devices for chamfering by skiving, wherein the two chamfering devices for chamfering by skiving are arranged on the second slide, wherein also a further tool spindle for a further toothed tool is arranged on the rotary mount, and wherein a further tool axis, about which the further tool spindle can be rotated, is pivoted by a further azimuthal angle $\varphi w$ in the xy plane in relation to the x axis and by a further polar angle $\Theta w$ in relation to the z axis, where $\varphi w=-\varphi$ and $\Theta w=\Theta$.

12. The hobbing machine of claim 1, wherein the workpiece spindle is a fixed-location workpiece spindle arranged on the machine bed.

13. The hobbing machine of claim 1, wherein the motor drive is attached to the machine bed and configured to move the driven slide, wherein the non-driven slide is pushed and pulled along with the driven slide.

14. The hobbing machine of claim 1, wherein the non-driven second slide is pushed and pulled along with the driven first slide.

15. A hobbing and chamfering machine, comprising:
a machine bed;
a workpiece spindle disposed on the machine bed, wherein a workpiece is configured to be rotated about a workpiece axis by the workpiece spindle;
a rail system comprising at least one rail disposed on the machine bed, the rail system running in a horizontal direction parallel to the workpiece axis;
a first slide with a first slide guide system, the first slide configured to slide parallel to the workpiece axis on the at least one rail by the first slide guide system;

a hobbing head disposed on the first slide, wherein the hobbing head is configured to slide on and relative to the first slide in a direction perpendicular to the workpiece axis;
a second slide with a second slide guide system, the second slide configured to slide parallel to the workpiece axis on the at least one rail by the second slide guide system; and
at least one chamfering device disposed on the second slide, wherein the at least one chamfering device is configured to slide on and relative to the second slide in a direction perpendicular to the workpiece axis;
wherein the at least one rail of the rail system comprises at least one common rail that is used to guide both the first slide guide system and the second slide guide system, wherein each common rail is used in common to guide both the first slide guide system and the second slide guide system;
wherein the hobbing head and the at least one chamfering device are configured to move independently to one another on their respective first and second slides in a direction perpendicular to the workpiece axis;
wherein the first slide and the second slide are disposed next to one another and are mechanically coupled together to move together in the horizontal direction parallel to the workpiece axis;
wherein the weight of the first slide and the hobbing head are supported on the at least one common rail by the first slide guide system, and the weight of the second slide and the at least one chamfering device are supported on the at least one common rail by the second slide guide system.

* * * * *